United States Patent [19]

Eggebrecht et al.

[11] Patent Number: 4,517,813

[45] Date of Patent: May 21, 1985

[54] AIR CONDITIONING SYSTEM AND AIR MIXING/WATER SEPARATION APPARATUS THEREIN

[75] Inventors: John L. Eggebrecht, Bellevue; Harold D. Rogers, Woodinville; Arthur S. Yorozu, Seattle, all of Wash.

[73] Assignee: The Boeing Company, Seattle, Wash.

[21] Appl. No.: 510,729

[22] Filed: Jul. 5, 1983

[51] Int. Cl.³ .............................................. F25D 21/06
[52] U.S. Cl. ........................................ 62/284; 62/93;
55/448; 55/459 B
[58] Field of Search ................... 62/93, 402, 272, 284;
55/448, 459 B

[56] References Cited

U.S. PATENT DOCUMENTS

| 1,974,145 | 9/1934 | Atwell | 183/120 |
|---|---|---|---|
| 2,519,028 | 8/1950 | Dodge | 183/32 |
| 2,686,406 | 8/1954 | Pessoa | 62/140 |
| 2,835,340 | 5/1958 | McGuff et al. | 183/65 |
| 2,852,922 | 9/1958 | Neumann et al. | 62/500 |
| 3,258,932 | 7/1966 | Kern | 62/93 |
| 3,623,332 | 11/1971 | Fernandes | 62/402 |
| 3,785,755 | 1/1974 | Novak et al. | 62/93 |
| 4,015,438 | 4/1977 | Kinsell et al. | 62/402 |
| 4,048,809 | 9/1977 | Simmons | 62/89 |

FOREIGN PATENT DOCUMENTS 2550935  5/1978  Fed. Rep. of Germany .

Primary Examiner—Ronald C. Capossela
Attorney, Agent, or Firm—Christensen, O'Connor, Johnson & Kindness

[57] ABSTRACT

An aircraft cabin air conditioning system with an air mixing/water separation manifold providing accelerated mixing and attendant removal of water droplets, ice and snow so as to save fuel and to reduce maintenance requirements through lowering the temperature and reducing the supply rate of fresh input ventilation/pressurization air with make-ups of ventilation air requirements met by recirculation of cabin air through the manifold where such mixing and water removal occurs.

4 Claims, 9 Drawing Figures

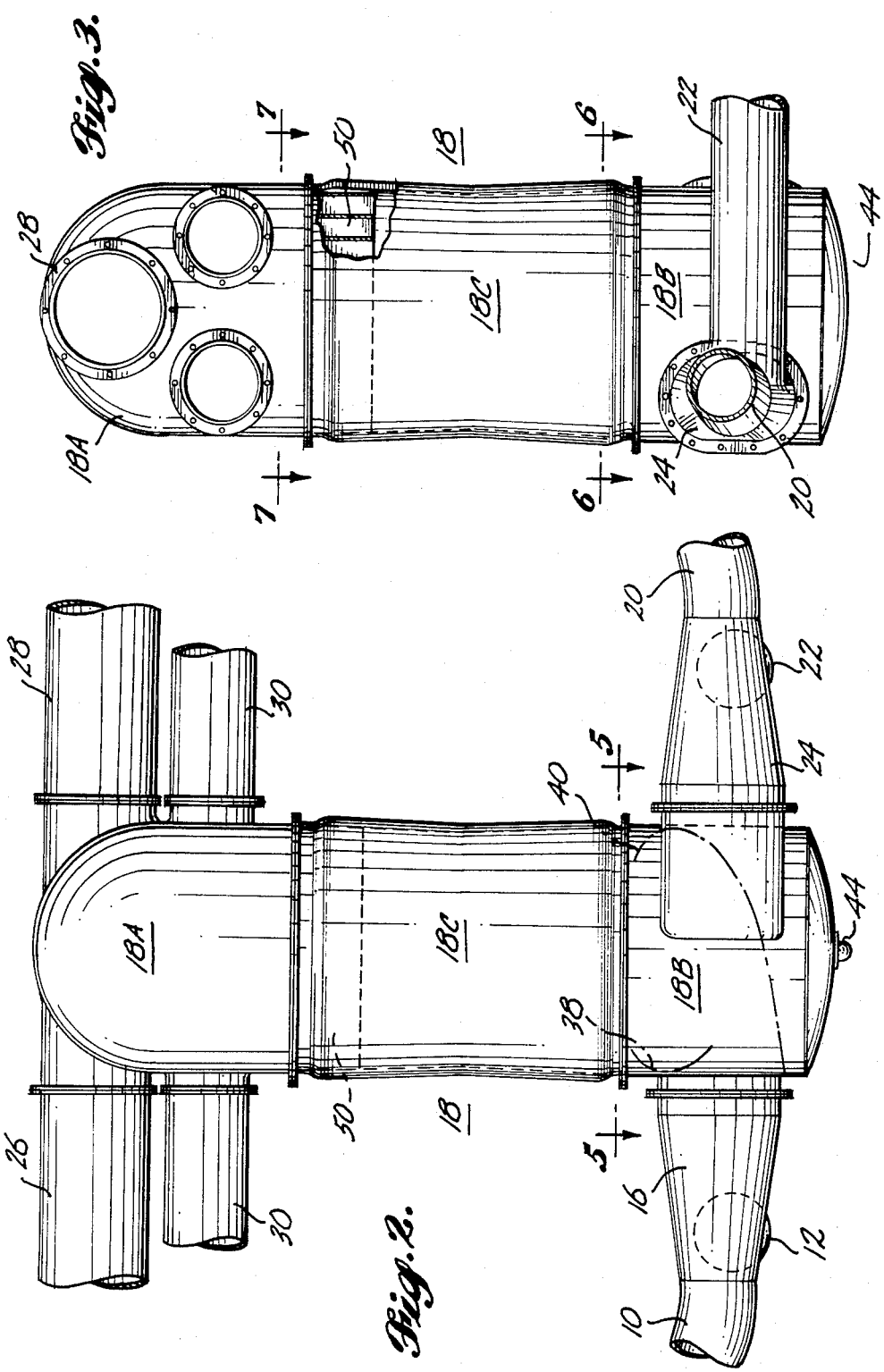

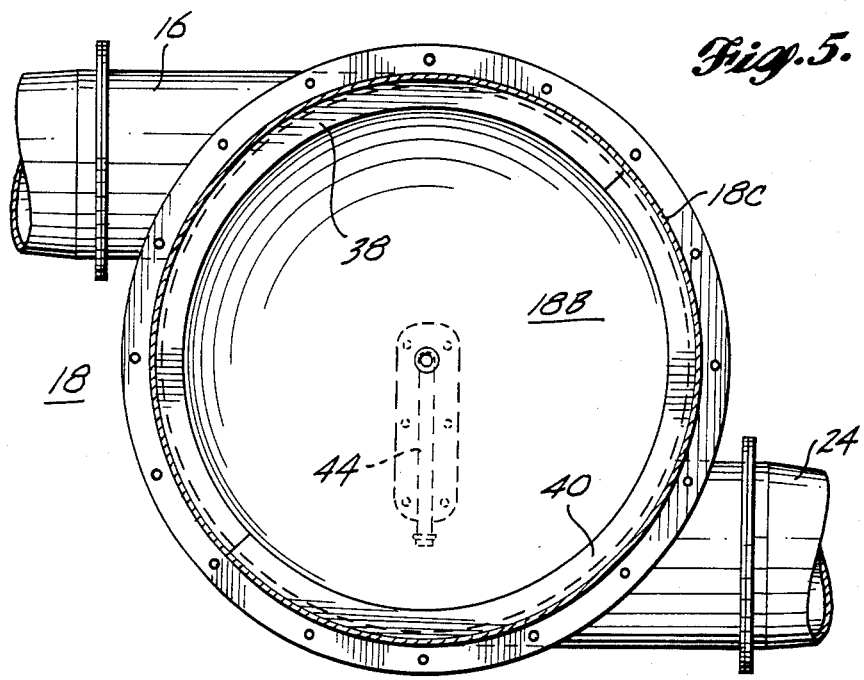
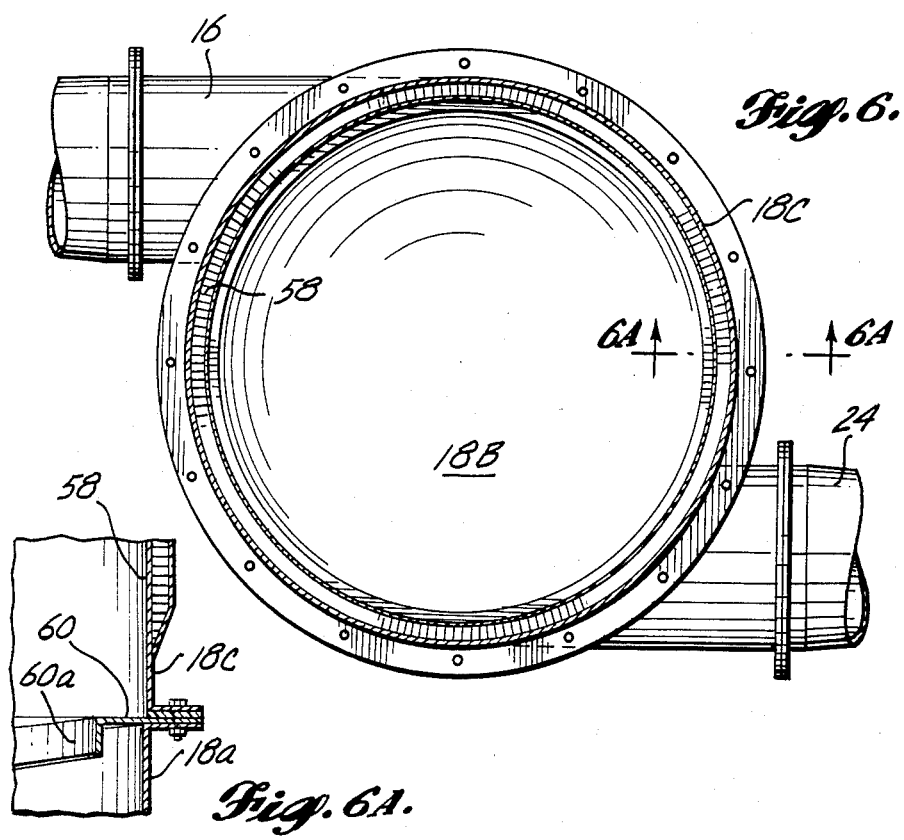

४,५१७,८१३

AIR CONDITIONING SYSTEM AND AIR MIXING/WATER SEPARATION APPARATUS THEREIN

BACKGROUND OF THE INVENTION

This invention provides improved air conditioning systems particularly useful in large passenger aircraft. However, it will be recognized that the concept has other applications as well and that the preferred form in which it is herein illustratively described is subject ot modifications and changes without departing from the essentials of the invention itself.

It has become largely conventional in modern passenger aircraft to satisfy cabin ventilation requirements with cooled outside air delivered under pressure and at a rate at least twice that required to maintain cabin pressure. As a result, normal operation of the cabin pressure control system results in dumping into the atmosphere at least as much air as that which leaks out through the joints and seals during high elevation flight. Fans and ducting within the cabin distribute the air in such a way as to maintain uniformity of temperature and ventilation in all required areas of the cabin.

In that type of system, the outside air supply was provided by bleed air from the engine compressor stages and was fed through heat exchangers and an air cycle machine (ACM) to reduce its temperature pressure and through a coalescer bag-type water separator to remove water. The system has shortcomings. Energy, hence fuel, required to produce this added increment of compressor bleed air output is high and it is expensive (approximately 6% of inflight fuel comsumption). Also, the coalescer bag-type water separator presents maintenance problems due to build-up of dust, oil droplets, and other particles in the bag interstices.

Attempts to maintain adequate ventilation with reduced engine bleed airflow rate compensated with recirulation air from the cabin by substantially reducing the temperature of ACM discharge air fed to the coalescer bag-type water separator would be met with the lower practical temperature limit of about 35° F. to prevent clogging of the coalescer bag with ice. In order to maintain satisfactory cooling performance with the foregoing temperature limitation, increased engine bleed air output is required, which materially increases engine operating fuel cost.

A primary object of the present invention is to overcome the aforementioned problems and limitations, and more specifically to provide an air conditioning system for the purposes indicated which permits utilizing recirculated cabin air effectively, substantially eliminating the prior maintenance problem with coalescer bag-type water separators, and substantially reducing operating cost in fuel consumption while providing for the same degree of ventilating air movement into the aircraft cabin as heretofor.

SUMMARY OF THE INVENTION

In achieving the above and related objectives according to the invention, an air mixing/water separation manifold is employed to which only part of the cabin's ventilation air input requirement is delivered from the ACM (originating as bleed air from the engine compressors) and the balance by recirculation of air from the cabin itself. The net input of fresh outside air pressurized by the engine compressor meets cabin pressurization maintenance requirements. The novel manifold arrangement satisfies air mixing and water separation requirements and in so doing incorporates an output plenum across which, supplying the various duct ports leading to the cabin, air pressure and air temperature are made uniform so as to permit definitive reliable cabin pressure and temperature control for all combinations of ACM and recirculation air sources.

Cabin air recirculated for injection into the manifold is warm, usually about 80° F. By comparison, ACM discharge air is cold, and in fact in this new system is made much colder than is permitted with the coalescer bag-type water separator to maintain system cooling performance with reduced engine bleed airflow and so as to permit recirculation of cabin air as a significant component in meeting cabin ventilation requirements. Because of the wide temperature differences of the input air components to the plenum, the need to provide uniform temperature and pressure for all combinations of ACM and recirculation air sources, and the necessity of performing the mixing operation in limited available space, accelerated thorough mixing, is an essential function of the manifold. Likewise, with significantly reduced ACM discharge air temperature, more effective water droplet and ice and snow removal are necessary attending accelerated air mixing.

In satisfying these operating requirements, the manifold chamber formed as an abruptly enlarged space through which ACM air and recirculation air pass, initiates mixing by the abrupt expansion that occurs as the air components enter the chamber. A further major contribution to accelerated mixing is provided by the swirling rise of air in the chamber initiated by tangentially directed inlet ports for the ACM air and cabin recirculation air in the lower portion of the manifold. Finally, completion of mixing in order to produce uniform pressure and temperature of air in the upper portion or plenum of the chamber, across the distributed outlet ports, is provided by a flow straightening or columnating grid which interrupts the swirl and leads the air in an entrained mass upwardly into the plenum.

The swirling motion of low-temperature ACM discharge air in the lower portion of the plenum initiated by the tangentially directed input of ACM air is also utilized to advantage in the effective removal of water droplets, ice and snow from the air flow rising in the manifold chamber. This is accomplished by one or more helically arranged wall mounted scuppers in the lower portion of the chamber which are pitched oppositely to the upwardly swirling spiral of air currents, and which catch the water flung outwardly by centrifugal force against the annular inside wall of the chamber. Momentum of the water in a circumferential direction aided by the forces of the swirling air itself, serve to drive the water downwardly to the bottom of the chamber where an outlet drain delivers it to the bilge.

In practice, based on service in air conditioning of Boeing 767 and 757 airplanes, it is found that the invention meets cabin ventilation and cabin pressurization requirements of the airplanes at substantially half the fuel cost of former systems, and that it does so without moving parts and without the former maintenance problems referred to above. It is a system adaptable to space limitations in airplanes or other vehicles, and functions with little or no maintenance requirements and without requirement for parts that move in operation or parts that must be removed or accessed for servicing or wear replacement.

These and other features and advantages of the invention will become more fully evident as the description proceeds with reference to the accompanying drawings.

DESCRIPTION OF THE DRAWINGS

FIG. 2 is a side elevation of the air mixing/water separating manifold or chamber complex with conduit couplings for incorporation in a total system.

FIG. 3 is a side elevation taken at right angles to that in FIG. 2.

FIG. 5 is a fragmentary transverse sectional view taken on line 5—5 in FIG. 2.

FIG. 6 is a transverse fragmentary sectional view taken on line 6—6 in FIG. 3. FIG. 6A is a fragmentary detailed sectional view taken on line 6A—6A in FIG. 6 showing the flanged joint between middle section and lower section of the manifold together with a water catch flange at the joint.

DETAILED DESCRIPTION REFERENCED TO DRAWINGS

Figure 1:
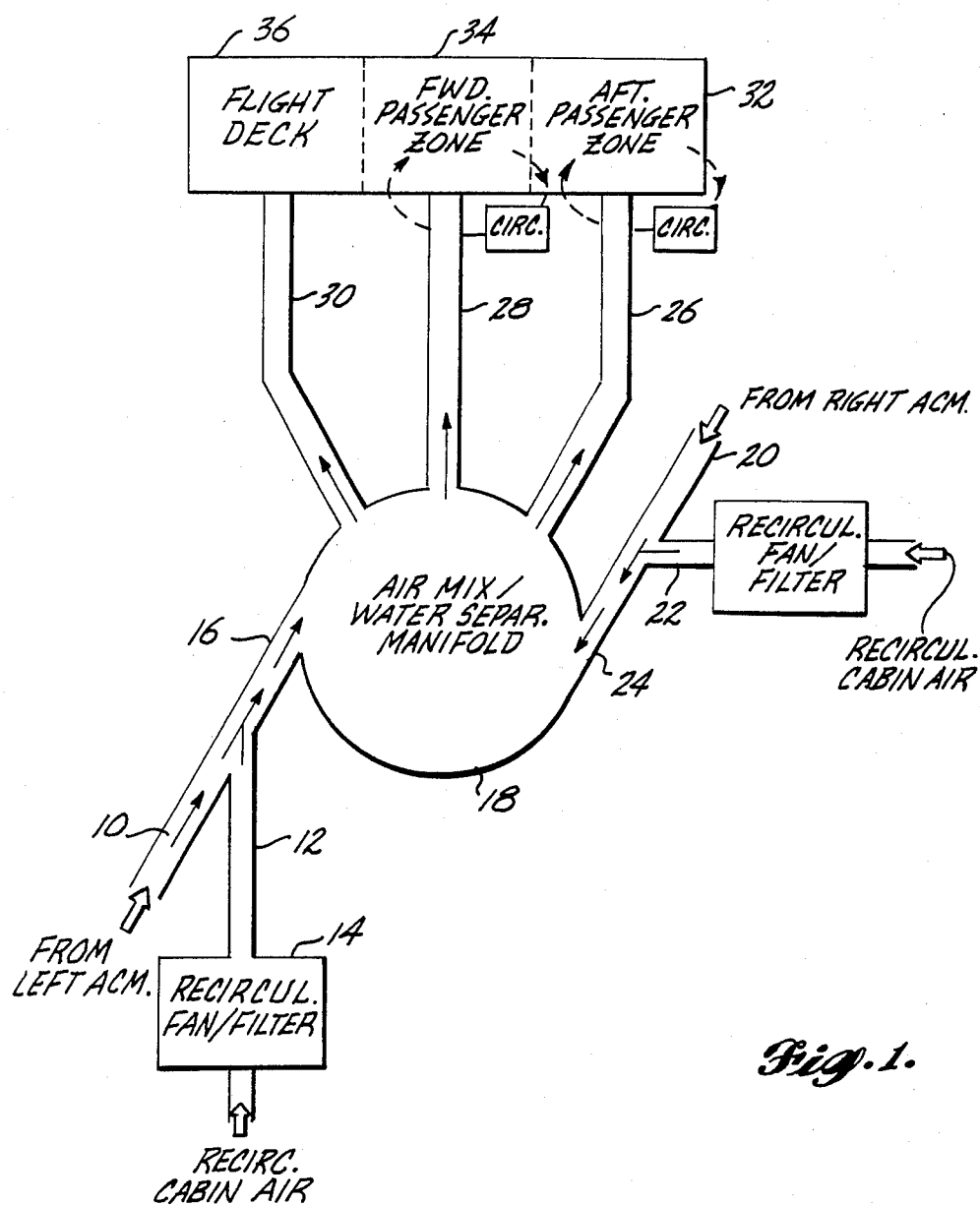
FIG. 1 is a simplified schematic diagram of a flow arrangement in which the illustrative improved system is incorporated.

In simplified form, as shown in FIG. 1, refrigerated air from the left or port side air cycle machine (ACM), which includes the turbocompressor and associated equipment for producing pressurized refrigerated fresh outside air for delivery to the interior compartments of the aircraft, is delivered through conduit 10, together in this example with air through converging conduit 12 receiving recirculating warm cabin air through fan/filter 14. Combined flow from conduits 10 and 12 merges into conduit 16 directed tangentially into the circular cylindrical chamber of air mixing/water separation manifold 18. Similarly, air from the right or starboard ACM is delivered under pressure into conduit 20 which merges with conduit 22 receiving recirculating warm cabin air, and the combined flow is similarly injected tangentially inn the same hand or sense into manifold 18 through conduit 24 such that the two injected streams create a circumferential high velocity swirl of injected air in the lower chamber of manifold 18. As shown, the recirculated cabin air is combined with pressurized fresh outside air from one or both ACM's in manifold 18 for ultimate delivery through conduits 26, 28 and 30 respectively serving the aft passenger zone 32, the forward passenger zone 34 and what is designated as the flight deck 36, including compartments and areas occupied by electrical and electronic apparatus to be cooled.

Figure 4:
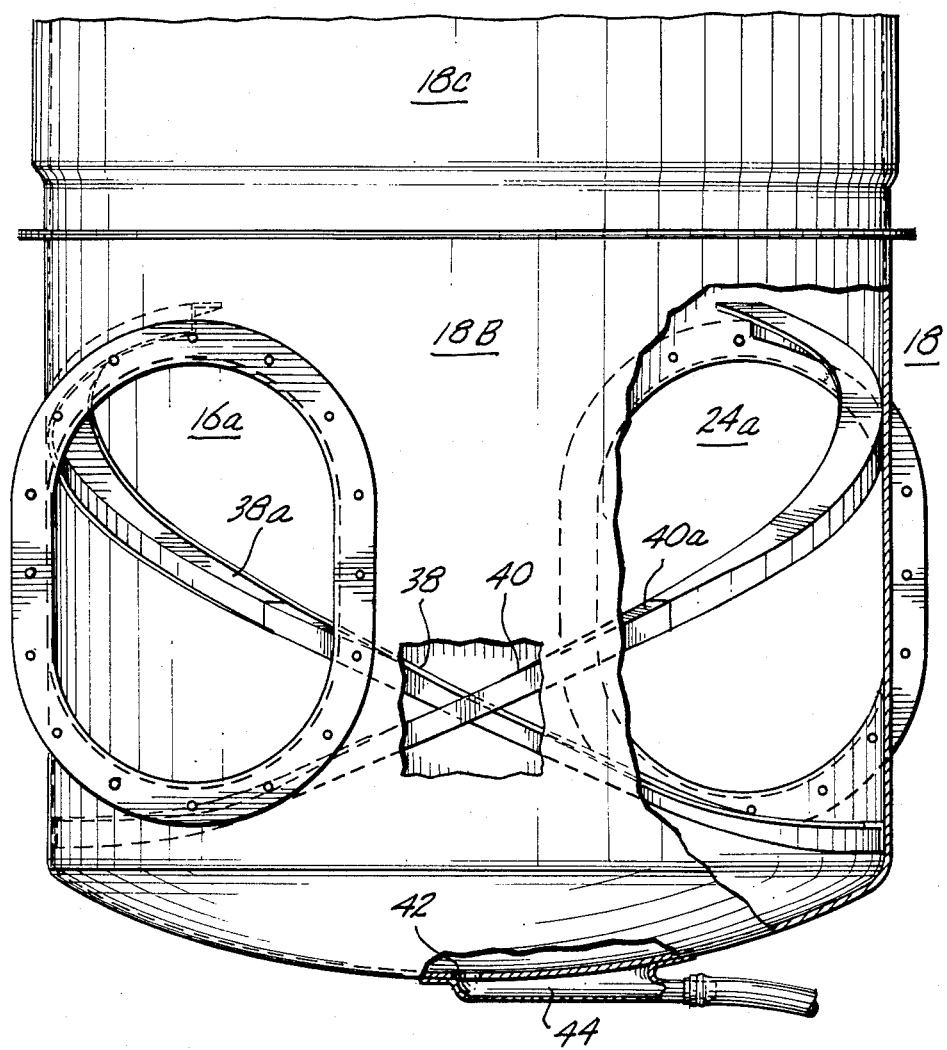
FIG. 4 is a fragmentary side elevation of the lower portion of the manifold at an enlarged scale, but taken from the aspect of FIG. 3.

In its preferred and illustrated form (FIG. 2 et seq.), air mixing/water separation manifold 18 comprises an upper end portion forming a plenum, a round cylindrical lower end portion forming a receiving chamber 18B and, continuing upwardly from the lower end portion, a cylindrical midportion 18C interconnecting the two. Pressurized air entering through ducts 16 and 24 into the lower chamber portion 18B undergoes abrupt expansion in the greater cross section and lower pressure environment within the chamber. It thereby undergoes a major amount of mixing from the expansion effect. In addition, the tangential direction of ducts 16 and 24 initiates further mixing by the swirling motion of the air rising in the chamber. The swirling motion serves a dual purpose, also causing droplets of water and particles of snow and ice to be flung outwardly and caught by the one or more helically formed scuppers 38 and 40. These, preferably two in number, extend with like hand over a height of approximately that of the vertically elongated oval-shaped air inlet orifices 16a and 24a, respectively, as shown in FIG. 4. These scuppers 40, L-shaped in cross section, have flanges 40a and 38a respectively projecting inwardly from the inner wall of lower chamber portion 18b. The pitch of the helicies of these scuppers is opposite that of the swirling rising air pattern, such that the motion of air forces the water accumulations downwardly to the manifold bottom 42 where there is a drain 44 discharging to the aircraft bilge.

As the rising swirling air approaches the upper flow discharge plenum section 18a, it encounters, and is required to pass through, a grid or egg crate-type columnator or flow straightener occupying the full interior cross section of the manifold chamber where the abrupt flow path changes finalize the mixing as well as create a uniform gradient of pressure and temperature across the plenum. As shown best in FIG. 7, the perpendicularly intersecting rows of grid strips 50a and 50b occupy respective planes parallel to the longitudinal upright axis of the manifold 18 to form relatively small cross-sectionally square flow spaces which allow entrained upward motion through the grid and remove remaining swirl components of flow motion.

Figure 7:
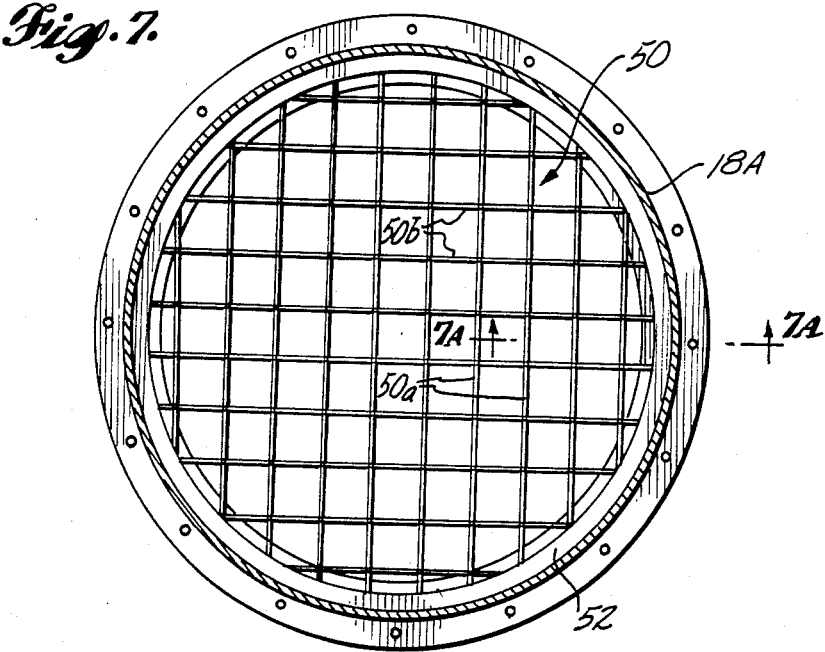
FIG. 7 is a transverse fragmentary sectional view taken on line 7—7 in FIG. 3 showing the mounting of a flow columnation honeycomb structure adjacent the upper end of the midsection of the manifold structure where it leads into the upper section constituting the discharge plenum thereof.
Figure 7A:
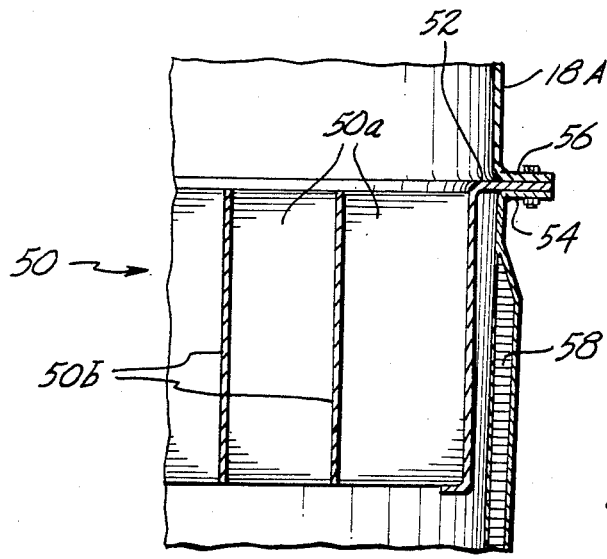
FIG. 7A is a sectional detailed view taken on line 7A—7A in FIG. 7 showing the joint referred to in connection with FIG. 7 and also certain other features.

FIG. 7 shows in some amount of detail the grid 50 and its support frame including an annular mounting flange 52 which projects outwardly to be sandwiched and held between an upper flange 54 on the upper edge of the chamber midsection 18c and a flange 56 on the lower edge of the upper or plenum section 18a. For purposes of thermal and acoustic insulation, as well as lending some added stiffness to the manifold wall, it is preferred to employ a honeycomb jacket 58 around the midsection 18c as shown.

FIG. 6a, in conjunction with its reference FIG. 6, illustrates the flange joint between the midsection and lower section of the plenum. As a further precaution against water being carried upward from the lower section of chamber, an annular catch ring of L-shaped cross section 60 has one leg held in the joint with the remainder projecting into the chamber with its free flange 60a projecting downwardly.

In the illustration, spaced outlet ducts 26 and 28 extend from the dome-shaped upper end portion or plenum of manifold 18 to the forward and aft passenger zones 34 and 32 of the aircraft. Somewhat smaller ducts 30 lead from still other spaced ports in the manifold plenum to the flight station and other portions of the aircraft requiring ventilation and pressurization.

It is preferred that the ports and the connecting duct end sections 16 and 24, which deliver air to them from the described sources, be of vertically elongated or of generally oval form. This has the advantage of spreading out the discharge over a vertical distance to improve the tangentially directed flow pattern producing the centrifugal effect for swirl mixing and to cause water and particles of snow and ice to be trapped by the scuppers in the lower section of the manifold.

In operation, fan-blown warm recirculating cabin air merges in the delivery duct with pressurized refrigerated fresh air from the air cycle machine (ACM). Largely stratified as they enter the lower portion of the manifold, these different components used to ventilate the cabin and to maintain cabin pressure are thoroughly mixed in the manifold chamber so that air in the discharge plenum across the spread of outlet ports is at uniform temperature and pressure. The uniformity of pressure and temperature is accomplished for all combinations of ACM and recircular air sources. It is found with such an arrangement that the ACM discharge may now be operated at a much lower temperature than that to which former systems were limited for the reasons already described. The system is substantially constant in its operation and virtually maintenance free. By using recirculation cabin air as a contribution to ventilation flow into the cabin of the aircraft, and by proportioning the recirculated cabin air about equally with that controlled by the engine compressors, the new system cuts substantially in half the fuel cost to achieve ventilation and pressurization of the aircraft. It is estimated that this represents approximately a 3% fuel saving.

These and other features, advantages and aspects of the invention will be recognized by those skilled in the art, and with the understanding that the claims that follow are intended to cover not only the illustrated embodiment, but also equivalent embodiments and variations.

The embodiments of the invention in which an exclusive property privilege is claimed are defined as follows:

1. An air mixing and water separation apparatus, for mixing and separating water particles from a combined flow of fresh and recirculated air for delivery into an enclosure such as an airplane cabin, comprising:
   (a) an elongate manifold having a lower end portion, an upper end portion and a midportion, the midportion extending along the longitudinal axis of the manifold and connected between the upper and lower end portions of the manifold, the interior longitudinal walls of the manifold having curved surfaces;
   (b) one or more inlet ducts connected to the lower end portion for introducing the combined air flow into the manifold, the inlet ducts being substantially tangent to the interior walls of the manifold where the inlet ducts are connected to the lower portion, the tangential connection causing a swirling motion of the combined air wherein the water particles are projected by centrifugal force to impinge upon the interior longitudinal walls, the swirling motion also causing mixture of the combined air;
   (c) one or more outlet ducts connected to the upper portion of the manifold for delivering the mixed air from the manifold to the enclosure;
   (d) flow redirection means positioned between the inlet ducts and the outlet ducts for converting the swirling motion of the mixed air into substantially uniform flow across and perpendicular to the longitudinal axis of the manifold; and
   (e) scupper means affixed to the interior wall of the manifold for removing from the manifold the water particles impinged thereon.

2. The apparatus of claim 1, wherein the flow redirection means is formed of perpendicularly intersecting rows of plate-like members disposed in planes parallel to the longitudinal axis of the manifold.

3. The apparatus of claim 2, further comprising a catch ring connected to the manifold between the lower portion and midportion thereof, the catch ring projecting into the manifold to halt upward movement of the water particles along the interior wall.

4. The apparatus of claims 1, 2 or 3, wherein the scupper means comprises substantially helically extending rib-like elements extending along the interior wall of the manifold, the rib-like elements configured and arranged to have a pitch opposite to the direction of the swirl of air in the manifold wherein the force of the swirling air acts to propel the water particles downwardly along the rib-like elements.

* * * * *